(12) United States Patent
Nagata et al.

(10) Patent No.: US 12,469,300 B2
(45) Date of Patent: Nov. 11, 2025

(54) SYSTEMS, DEVICES, AND METHODS FOR VEHICLE CAMERA CALIBRATION

(71) Applicant: Toyota Motor Engineering & Manufacturing North America, Inc., Plano, TX (US)

(72) Inventors: Katsumi Nagata, Foster City, CA (US); Masashi Nakagawa, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 849 days.

(21) Appl. No.: 17/575,291

(22) Filed: Jan. 13, 2022

(65) Prior Publication Data

US 2023/0222808 A1  Jul. 13, 2023

(51) Int. Cl.
| | | |
|---|---|---|
| *G06V 20/56* | (2022.01) | |
| *B60R 1/22* | (2022.01) | |
| *B60W 40/12* | (2012.01) | |
| *G06T 7/70* | (2017.01) | |
| *G06T 7/80* | (2017.01) | |

(52) U.S. Cl.
CPC ............ *G06V 20/56* (2022.01); *B60W 40/12* (2013.01); *G06T 7/70* (2017.01); *G06T 7/80* (2017.01); *B60R 1/22* (2022.01); *B60W 2420/403* (2013.01)

(58) Field of Classification Search
CPC ..... G06V 20/56; G06V 10/245; B60W 40/12; B60W 2420/403; G06T 7/70; G06T 7/80; B60R 1/22; B60R 1/23; B60R 1/24; B60R 1/27; B60R 1/28
See application file for complete search history.

(56) References Cited

U.S. PATENT DOCUMENTS

| | | |
|---|---|---|
| 9,491,450 B2 | 11/2016 | Kussel |
| 9,834,153 B2 | 12/2017 | Gupta et al. |
| 9,950,669 B2 | 4/2018 | Sypitkowski et al. |
| 10,000,164 B2 | 6/2018 | Wisnia |
| 10,089,396 B2 | 10/2018 | Endras et al. |
| 10,445,900 B1 | 10/2019 | Singh et al. |
| 10,486,596 B2 | 11/2019 | Rathi et al. |
| 10,671,868 B2 | 6/2020 | Koravadi |

(Continued)

FOREIGN PATENT DOCUMENTS

| | | |
|---|---|---|
| DE | 102015008553 | 7/2015 |
| WO | WO2021139388 | 7/2021 |
| WO | WO2021139749 | 7/2021 |

*Primary Examiner* — Vincent Rudolph
*Assistant Examiner* — Timothy Choi
(74) *Attorney, Agent, or Firm* — Snell & Wilmer LLP (57) ABSTRACT

Systems, devices, and methods for calibrating a camera of a vehicle. A system may include the camera configured to be attached to the vehicle and capture a video. The system may further include an output device having a display. The output device may be configured to receive the video and display the video, a first overlay over the video indicating a current center of field of view of the camera, and a second overlay over the video indicating an aligned center of field of view of the camera on the display. The first overlay may be aligned with the second overlay on the display of the output device or an aim of the camera may be manually changed until the first overlay aligns with the second overlay to calibrate the camera.

20 Claims, 5 Drawing Sheets

(56) References Cited

U.S. PATENT DOCUMENTS

| | | | |
|---|---|---|---|
| 11,072,284 B2 | 7/2021 | Windeler et al. | |
| 2007/0299596 A1* | 12/2007 | Moritz | G06T 7/80 |
| | | | 348/148 |
| 2011/0102583 A1* | 5/2011 | Kinzalow | G06T 7/80 |
| | | | 348/148 |
| 2012/0009205 A1 | 1/2012 | Gegg et al. | |
| 2013/0109272 A1 | 5/2013 | Rindlisbacher | |
| 2014/0313335 A1* | 10/2014 | Koravadi | H04N 7/181 |
| | | | 348/148 |
| 2015/0254853 A1* | 9/2015 | Tanaka | H04N 17/002 |
| | | | 348/148 |
| 2016/0311374 A1* | 10/2016 | May | H04N 5/2628 |
| 2020/0175721 A1* | 6/2020 | Fegyver | G06T 7/136 |
| 2020/0367056 A1 | 11/2020 | Hodge et al. | |
| 2022/0191468 A1* | 6/2022 | Kolberg | G09G 3/002 |
| 2022/0364874 A1* | 11/2022 | Jung | G01C 21/367 |

\* cited by examiner

SYSTEMS, DEVICES, AND METHODS FOR VEHICLE CAMERA CALIBRATION

BACKGROUND

1. Field

The present disclosure is directed to systems, devices, and methods for calibrating a camera of a vehicle.

2. Description of the Related Art

Vehicles (e.g., automobiles, motorcycles, SUVs, trucks, motorhomes, etc.) may have one or more cameras located on or in the vehicle to enable viewing of surroundings or areas that are otherwise out of a periphery of a driver and/or a passenger of the vehicle. Such surroundings or areas may be difficult or impossible to be seen depending on the position of the driver and/or the passenger. Examples of such surroundings or areas may include a front, a rear, sides, back seats, and the cargo area of the vehicle. As such, the cameras may be positioned to capture an exterior and/or an interior of the vehicle. For instance, the cameras may enable the driver and/or the passenger to view surroundings or areas of the vehicle from the perspective of a front bumper, a rear bumper, a rear view mirror, a trunk, a tailgate, a dashboard, side bumpers, side view mirrors, fenders, back seat headrests, armrests, and/or the like. The video and/or image captured by the cameras may then be viewed on a display which may be integrated to the vehicle or separate from the vehicle.

Generally, the cameras require a calibration process to properly align and center the field of view of the cameras with respect to the vehicle before use. The calibration process generally includes a setup where a target image is positioned at a specific distance and angle from the vehicle or each camera. Preparing such a setup is often time consuming and cumbersome.

As such, there is a need for systems, devices, and methods for calibrating a camera of a vehicle.

SUMMARY

Examples described herein relate to systems, devices, and methods for calibrating a camera of a vehicle. A system may include the camera attached to the vehicle. The camera may capture and/or record a still and/or a video of an exterior and/or an interior of the vehicle. The captured image may be viewed on a local and/or external display. The system may further include an output device. The output device may receive the captured image and display the captured image on a display of the output device. The display of the output device may display a first overlay and a second overlay over the captured image. The first overlay may indicate a current center of field of view of the camera, and the second overlay may indicate an aligned center of field of view of the camera. A user (e.g., a driver, a passenger) may align the first overlay with the second overlay via an input device of the output device to calibrate the camera remotely or manually change an aim of the camera until the first overlay aligns with the second overlay.

In one aspect, the disclosure is embodied in a calibration system for a vehicle. The system includes a camera. The camera is configured to be attached to the vehicle and capture a video. The system further includes an output device. The output device has a display. The output device is configured to receive the video and display the video, a first overlay over the video indicating a current center of field of view of the camera, and a second overlay over the video indicating an aligned center of field of view of the camera on the display.

These and other embodiments may optionally include one or more of the following features. The output device may be further configured to receive a vehicle identification number (VIN) of the vehicle and generate the second overlay based on the VIN. The output device may be further configured to retrieve locally or remotely stored instructions specific to the vehicle and the camera to generate the first overlay and the second overlay based on the VIN. The output device may be further configured to determine positions of the first overlay and the second overlay based on a visible portion of an exterior of the vehicle in the video. The output device may be a remote device or a center display unit of the vehicle.

The system may further include a mechanical device configured to adjust an aim of the camera based on user input or locally or remotely stored data associated with a previously performed calibration. The user input may include aligning the first overlay with the second overlay on the display of the output device such that the first overlay overlaps with the second overlay.

In another aspect, the disclosure is embodied in a device for calibrating a camera of a vehicle. The device includes a wireless transceiver. The wireless transceiver is configured to receive a video from the camera. The device further includes a processor. The processor is configured to be coupled to the wireless transceiver and generate a first overlay indicating a current center of field of view of the camera and a second overlay indicating an aligned center of field of view of the camera based on the received video. The device further includes a display. The display is configured to be coupled to the processor and display the video, the first overlay over the video, and the second overlay over the live video.

These and other embodiments may optionally include one or more of the following features. The device may further include an input device. The input device may be configured to be coupled to the processor and receive a VIN of the vehicle. The processor may be further configured to generate the second overlay based on the VIN. The device may further include a memory. The memory may be configured to be coupled to the processor and store instructions specific to the vehicle and the camera. Alternatively, the wireless transceiver may be further configured to receive the instructions from a remote server. The processor may be further configured to select the instructions based on the VIN and generate the first overlay and the second overlay based on the instructions. The processor may be further configured to determine positions of the first overlay and the second overlay based on a visible portion of an exterior of the vehicle in the video. The input device may be further configured to receive user input. The wireless transceiver may be further configured to communicate the received user input to an electronic control unit (ECU) of the vehicle to adjust an aim of the camera based on the user input. The user input may include aligning the first overlay with the second overlay such that the first overlay overlaps with the second overlay. The device may be attachable to the vehicle.

In yet another aspect, the disclosure is embodied in a method for calibrating a camera of a vehicle. The method includes capturing a video by the camera. The method further includes receiving the video by a wireless transceiver of an output device. The method further includes determining a current center of field of view of the camera and an aligned center of field of view of the camera based on the video by a processor of the output device. The method further includes displaying the video, a first overlay over the video based on the current center of field of view of the camera, and a second overlay over the video based on the aligned center of field of view of the camera by a display of the output device.

These and other embodiments may optionally include one or more of the following features. The method may further include receiving a VIN of the vehicle by the wireless transceiver of the output device. The processor of the output device may determine the aligned center of field of view of the camera further based on the VIN. The method may further include retrieving locally or remotely stored instructions specific to the vehicle based on the VIN by the processor of the output device. The processor of the output device may determine the current center of field of view of the camera and the aligned center of field of view of the camera further based on the instructions. The method may further include determining positions of the first overlay and the second overlay based on a visible portion of an exterior of the vehicle in the video by the processor of the output device.

The method may further include adjusting an aim of the camera based on user input or locally or remotely stored data associated with a previously performed calibration by a mechanical device of the vehicle. The method may further include aligning the first overlay with the second overlay on the display of the output device such that the first overlay overlaps with the second overlay to generate the user input by an input device of the output device.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

DETAILED DESCRIPTION

The systems, devices, and methods described herein calibrate a camera of a vehicle (e.g., an automobile, a motorcycle, a truck, a motorhome, etc.). The devices may be utilized by the systems and methods. The term "device" may be interchanged with "output device" in describing the systems and methods. The camera of the vehicle may capture and/or record a still and/or a video of an exterior (e.g., front, rear, sides, etc.) and/or an interior (e.g., backseats, trunk, etc.) of the vehicle. The captured image may be viewed on a local display (e.g., a center display unit, a console gauge display, a rear view mirror display) and/or an external display (e.g., a smartphone, a tablet, an external infotainment unit, etc.) to view otherwise difficult or impossible to see areas surrounding or within the vehicle. The output device or the device, which may be remote from the vehicle or integrated to the vehicle, may receive the captured image and display the captured image on a display of the device. The display of the device may display a first overlay and a second overlay over the captured image. The first overlay and the second overlay may be cast over the captured image, thereby providing an augmented reality (AR). The first overlay may indicate a current center of field of view of the camera, and the second overlay may indicate an aligned center of field of view of the camera. The term "current" may mean a current state in real time or last state that was captured by the camera. A user (e.g., a driver, a passenger) may align the first overlay with the second overlay via an input device of the output device to calibrate the camera remotely or manually change an aim of the camera until the first overlay aligns with the second overlay. The term "user" or "driver" may be interchanged with "passenger" when referring to autonomous or semi-autonomous vehicles. Wireless communications described throughout this disclosure may include but are not limited to cellular, Bluetooth®, infrared (IR), radio frequency (RF), or WiFi®.

The device may advantageously scan or otherwise receive a VIN of the vehicle to retrieve instructions specific to the vehicle and the camera to generate the first overlay and the second overlay. Further, the device may advantageously determine positions of the first overlay and the second overlay based on a visible portion of the exterior of the vehicle in the captured image. The device may be previously programmed to store instructions specific to the vehicle and the position.

Figure 1:
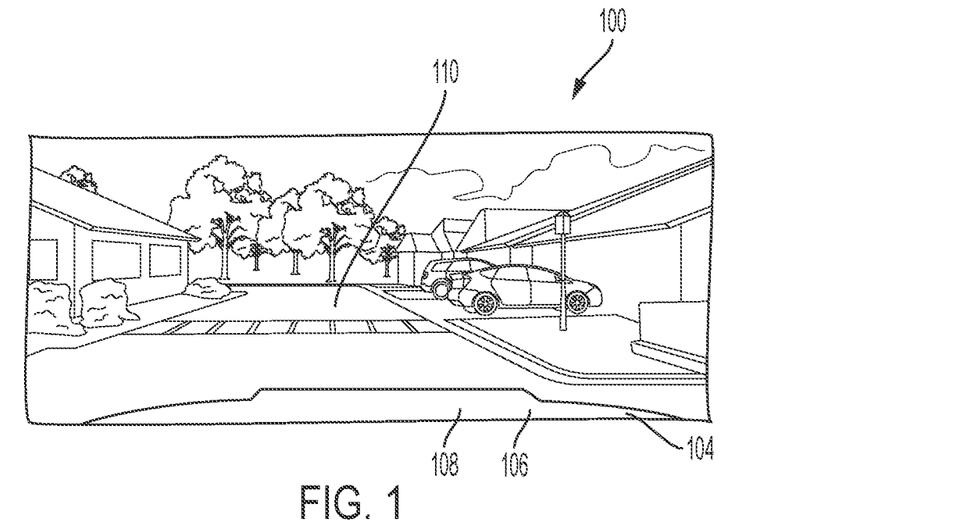
FIG. 1 shows an image captured by a camera of a vehicle according to an aspect of the present disclosure.

FIG. 1 shows an image 100 captured by a camera 102 (see FIG. 3A) of a vehicle 104. In embodiments where the vehicle has a plurality of cameras, the user may select the camera 102 by providing local or remote user input. The image 100 may be a still image or a video. The image 100 may be a live footage captured in real time. The image 100 may also be a delayed image or a pre-recorded image. The image 100 may represent a field of view of the camera 102. The field of view may be static or fixed. The field of view may encompass outer surroundings of the vehicle 104 as shown in FIG. 1. The outer surroundings of the vehicle 104 may include a road 110 in front of, next to, and/or trailing the vehicle 104 based on the position of the camera 102. The outer surroundings may also include curbs, sidewalks, traffic lights, traffic signs, road signs, landmarks, buildings, the sky, and/or the like. In some embodiments, the field of view may encompass an interior of the vehicle 104 in addition to or in lieu of the outer surroundings. The interior of the vehicle 104 may include a cockpit, a backseat area, or a trunk, or a bed of the vehicle 104, for example. The image 100 may include a portion of an exterior 106 of the vehicle 104 as shown in FIG. 1. The portion of the exterior 106 that is visible in the image 100 may be a hood 108 of the vehicle as shown in FIG. 1. In some embodiments, the visible portion of the exterior 106 may include a front bumper, a rear bumper, a trunk, a tailgate, doors, and/or tires of the vehicle 104, for example.

The image 100 may have a range of aspect ratios. For example, the image 100 may have a wide aspect ratio as shown in FIG. 1. The wide aspect ratio may be 16:9 or 16:10 by example. In some embodiments, the aspect ratio may be vertically transformed (e.g., 9:16, 10:16). In some embodiments, the aspect ratio may be 3:2, 4:3, or 5:4. The image 100 may have a range of resolutions. The resolution may have a range between and including 240p and 4320p by example.

The image 100 may capture a current field of view. Initially, the current field of view may not be an aligned field of view. An aligned field of view may be established when the visible portion of the exterior 106 of the vehicle 104 is horizontally centered and vertically at an optimal position relative to borders of the field of view. The vertically optimal position may be predetermined by the manufacturer or the user of the vehicle 104. Criteria for the vertically optimal position may include minimizing obstruction of the road view and maximizing the distance visible through the camera 102.

Figure 2:
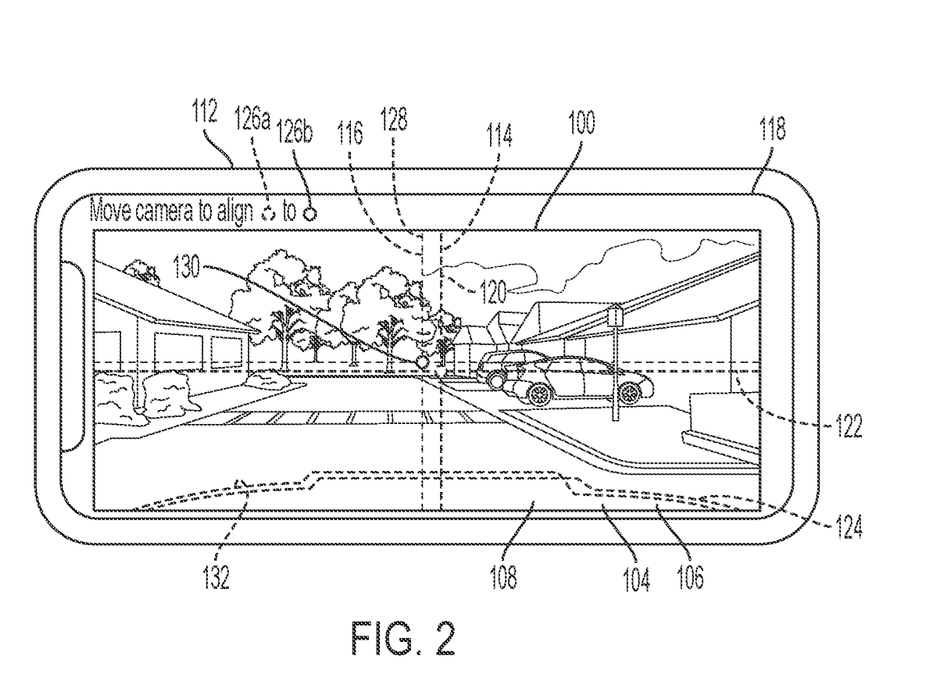
FIG. 2 shows an output device displaying the image of FIG. 1, a first overlay over the image, and a second overlay over the image according to an aspect of the present disclosure.

FIG. 2 shows an output device 112 displaying the image 100, a first overlay 114 over the image 100, and a second overlay 116 over the image 100. The output device 112 may be a remote device or integrated to the vehicle 104. A remote device may be a mobile device such as a cellular phone, a smartphone, a tablet, a multimedia player, a laptop and the like. In some embodiments, the remote device may be a stationary device such as a desktop computer. An output device 112 that is integrated to the vehicle 104 may be a center display unit, an infotainment unit, or a display which may be located on a variety of locations on the vehicle 104 (e.g., a gauge cluster, a rear-view mirror, a headrest, etc.). In FIG. 2, the output device 112 shown is a smartphone by example. The output device 112 may have a display 118. The display 118 may be a liquid crystal display (LCD), a light-emitting diode display (LED), an organic light emitting diode (OLED), a plasma display, a cathode-ray tube (CRT) display, a digital light processing display (DLPT), a microdisplay, a projection display, or any other conventional display. The image 100, the first overlay 114, and the second overlay 116 may be displayed on the display 118. The displaying may be facilitated by a software that runs on the output device 112. The software may be a native or third-party mobile application, for example. The software may have a user interface that enables interaction with the software.

Figure 3A:
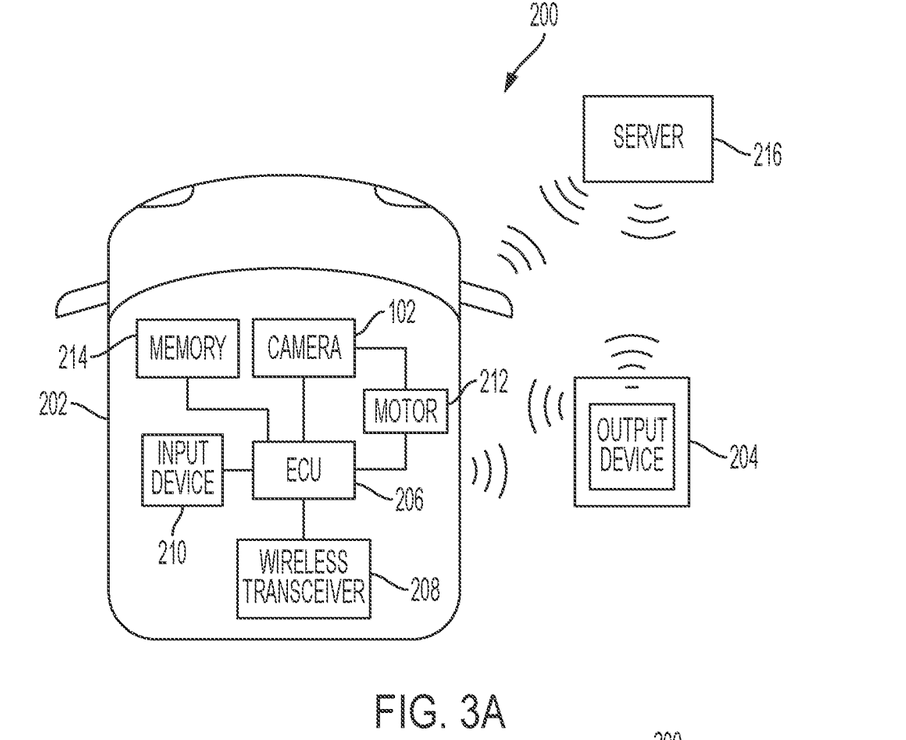
FIG. 3A shows a schematic view of a calibration system for a vehicle according to an aspect of the present disclosure.

The first overlay 114 may indicate a current center of field of view of the camera 102 (see FIG. 3A). The first overlay 114 may be dynamic and change position vertically and/or horizontally relative to second overlay 116 as the aim of the camera 102 is changed. The first overlay 114 may include a vertical line 120 and a horizontal line 122 crossing each other at the center of the field of view. The first overlay 114 may also include a trace 124 of the visible portion of the exterior 106 of the vehicle 104. The trace 124 of the first overlay 114 may be aligned with the visible portion of the exterior 106. The trace 124 may contour an outline of the visible portion of the exterior 106. The trace 124 may be generated based on instructions specific to the vehicle 104 and the camera 102. The instructions may include information pertaining to the make, model, trim, tire size, and/or color of the vehicle 104 as well as the position and lens specifications of the camera 102. The output device 112 may determine the trace 124 based on an outline, a shape, and/or a color of the hood 108 as well as information on the camera 102 (see FIG. 3A) from the instructions as shown in FIG. 2. The trace 124 may be generated based on conventional image recognition techniques using the parameters provided by the instructions. In some embodiments, the trace 124 may be generated solely based on image recognition.

The instructions may be updated or modified if the vehicle 104 is modified in any way. For example, the vehicle 104 may be painted a different color or an aftermarket part may be added or switched with a factory part. In a more particular example, if the hood 108 is altered in any way, the instructions may be manually updated to reflect the alteration such that an accurate trace 124 representing the altered shape of the hood 108 is generated and displayed.

The first overlay 114 may be shown in dashed lines as an example. In other examples, the first overlay 114 may be shown in uninterrupted lines, dotted lines, or the like. In some embodiments, the first overlay 114 may be a crosshair. The first overlay 114 may have a distinct color and/or shape for identification. The display 118 may display a color code 126*a* or a shape code to aid in identifying the first overlay 114.

The second overlay 116 may indicate an aligned center of field of view of the camera 102 (see FIG. 3A). The aligned center of field of view may include the visible portion of the exterior 106 of the vehicle 104 horizontally centered and vertically at an optimal position relative to the borders of the field of view. When the center of the field of view is aligned, the field of view may be said to be aligned. The second overlay 116 may include a vertical line 128 and a center point 130 indicating a center of the vertical line 128. The vertical line 128 may be horizontally centered relative to the aligned field of view. The second overlay 116 may also include a trace 132 of the visible portion of the exterior 106 of the vehicle 104. Initially, the trace 132 of the second overlay 116 may not be aligned with the visible portion of the exterior 106. Instead, the trace 132 may outline the visible portion of the exterior 106 in a horizontally centered and vertically at an optimal position relative to the aligned field of view. The trace 132 may be generated based on instructions specific to the vehicle 104 and the camera 102. The instructions may include information pertaining to the make, model, trim, and/or color of the vehicle 104 as well as the position and lens specifications of the camera 102 and the vertically optimal position of the visible portion of the exterior 106. The output device 112 may determine the position and/or the shape of the trace 132 based on the instructions. The output device 112 may not show any visible portion of the exterior 106 when the screen size/resolution of the output device 112 is limited.

The instructions may be updated or modified if the vehicle 104 is modified in any way. For example, an aftermarket part may be added or switched with a factory part. In a more particular example, if the hood 108 is altered in any way, the instructions may be manually updated to reflect the alteration such that an accurate trace 132 representing the altered shape of the hood 108 is generated and displayed.

The second overlay 116 may be shown in dashed lines as an example. In other examples, the second overlay 116 may be shown in uninterrupted lines, dotted lines, or the like. In some embodiments, the second overlay 116 may be a crosshair. The second overlay 116 may have a distinct color for identification. In other words, the second overlay 116 may have a distinct color and/or shape than the first overlay 114. The display 118 may display a color code 126*b* or a shape code to aid in identifying the second overlay 116.

The user may adjust an aim of the camera 102 (see FIG. 3A) by using the first overlay 114 and the second overlay 116 as a guide to calibrate the camera 102. The user may adjust the aim until the first overlay 114 is aligned with the second overlay 116 vertically and horizontally. In some embodiments, the adjustment may be manual where the user physically holds and moves the camera 102. In some embodiments, the adjustment may be automatic where the output device 112 controls the aim of the camera 102 until the first overlay 114 is aligned with the second overlay 116. In some embodiments, the adjustment may be semi-automatic. For example, the user may drag the first overlay 114 until the first overlay 114 is aligned with the second overlay 116. The user may use a finger on the display 118 where the display is touchscreen to drag the first overlay 114. The dragging input may be communicated to the vehicle 104 where the input is translated into aim displacement and used to adjust the aim of the camera 102 with an actuator (e.g., a motor). In other examples, the user may enter control inputs to the output device 112 or directly to the vehicle 104 through other means which will be discussed further to adjust the aim of the camera 102 with the actuator until the first overlay 114 is aligned with the second overlay 116.

FIG. 3A shows a schematic view of a calibration system 200 for a vehicle 202. The vehicle 202 may have one or more specifications of the vehicle 104 (see FIGS. 1-2). The calibration system 200 may include one or more components of the vehicle 202, an output device 204, and a server 216. The output device 204 may have one or more specifications of the output device 112 (see FIG. 2). The components of the vehicle 202 may include the camera 102, an ECU 206, a wireless transceiver 208, an input device 210, a motor 212, and a memory 214.

The vehicle 202 is a conveyance capable of transporting a person, an object, or a permanently or temporarily affixed apparatus. The vehicle 202 may have an automatic or manual transmission. The vehicle 202 may be a self-propelled wheeled conveyance, such as a car, an SUV, a truck, a bus, a van or other motor or battery driven vehicle. For example, the vehicle 202 may be an electric vehicle, a hybrid vehicle, a plug-in hybrid vehicle, a fuel cell vehicle, or any other type of vehicle that includes a motor/generator. The vehicle 202 may be an autonomous or semi-autonomous vehicle having self-driving capabilities.

The camera 102 may be a conventional camera used in exteriors and/or interiors of vehicles. The camera 102 may capture and/or record still images and/or video footage. The camera 102 may be connected to the ECU 206 via a wireless or a wired connection. Additionally, the camera 102 may be directly connected to the output device 204 via a wireless or a wired connection.

The ECU 206 may be programmed to control one or more operations of the vehicle 202. In some embodiments, there may be a plurality of ECUs 206. The ECU 206 may be electrically coupled to one or more components of the vehicle 202. For example, the ECU 206 may be coupled to the camera 102, the wireless transceiver 208, the input device 210, the motor 212, and the memory 214 as shown in FIG. 3A. The ECU 206 may process data for and control the one or more components of the vehicle 202. In some embodiments, the ECU 206 may be a central ECU configured to control one or more operations of the entire vehicle 202. In some embodiments, the ECU 206 may be multiple ECUs located within the vehicle 202 and each configured to control one or more local operations of the vehicle 202. Multiple ECUs may communicate with each other via a controller area network (CAN bus) system or another conventional vehicle communication system.

In some embodiments, the ECU 206 may be one or more computer processors or controllers configured to execute instructions stored in a non-transitory memory. The memory 214 may store machine-readable instructions usable by the ECU 206 and may store other data as requested by the ECU 206. The memory 214 may be a random-access memory (RAM), a disk, a flash memory, optical disk drives, a hybrid memory, or any other storage medium that can store data. The memory 214 may store data in an encrypted or any other suitable secure form. In some embodiments, the remote server 216 accessible by the ECU 206 via a network connection may be utilized in addition to or in lieu of the memory 214 to store data.

The wireless transceiver 208 may wirelessly exchange information with the output device 204. The wireless transceiver 208 may include but is not limited to a cellular, a Bluetooth®, an IR, an RF, or a WiFi® based communication hardware. In some embodiments, some or all of the aforementioned communication methods may be available for selection of the user based on preference or suitability (e.g., signal travel distance, signal availability, signal interference, signal travel speed, etc.). The wireless transceiver 208 may utilize another conventional wireless communication technology.

The input device 210 may receive visual, auditory, and/or touch input. For example, the input device 210 may include a camera, a microphone, a touchscreen, a button, and/or a remote. The user may input commands and information into the input device 210 for the ECU 206 to process and use to control the one or more components of the vehicle 202. For example, the input device 210 may receive biometric information, voice command, and/or touch input with one or more fingers.

The motor 212 may adjust the aim of the camera 102. The motor 212 may receive control instructions directly from the output device 204 or from the ECU 206. The ECU 206 may control the motor 212 based on input received by the input device 210 and/or the output device 204. In some embodiments, the ECU 206 may control the motor 212 based on locally or remotely stored instructions or data. The motor 212 may be a DC motor, an AC motor, a servo motor, or any other conventional electric motor. In some embodiments, the motor 212 may be absent, and the camera 102 may be adjusted manually by hand or alternative mechanically by an actuator or another mechanical device.

During calibration, the camera 102 may capture the image 100 (see FIG. 1), and the image 100 may be transmitted to the output device 204 via the wireless transceiver 208. The image 100 may be stored in the memory 214 and/or a server. In some embodiments, the wireless transceiver 208 may obtain the image 100 from the memory 214. In some embodiments, the output device 204 may obtain the image 100 directly from the server 216.

Once the image 100 is received by the output device 204, the output device 204 may generate and display the first overlay 114 (see FIG. 2) and the second overlay 116 (see FIG. 2) over the image 100 (see FIG. 2). The user may then adjust the aim of the camera 102 by hand, by entering input into the input device 210, or by entering input into the output device 204 until the first overlay 114 is aligned with the second overlay 116. In embodiments where adjustment instructions are entered into the input device 210, the instructions may be processed by the ECU 206 to actuate the motor 212. In embodiments where adjustment instructions are entered into the output device 204, the output device 204 may communicate the instructions to the wireless transceiver 208 directly or through the server 216, and then the ECU 206 may process the instructions to actuate the motor 212. In some embodiments, the output device 204 may automatically align the first overlay 114 with the second overlay 116, generate alignment instructions, and communicate the instructions to the ECU 206 through the wireless transceiver 208 and/or the server 216. The ECU 206 may then process the instructions to actuate the motor 212. Data associated with the calibration process may be locally or remotely stored. The stored calibration data may be recalled by the ECU 206 in future calibrations to actuate the motor 212 to adjust the aim of the camera 102 should the camera 102 be misaligned again.

Figure 3B:
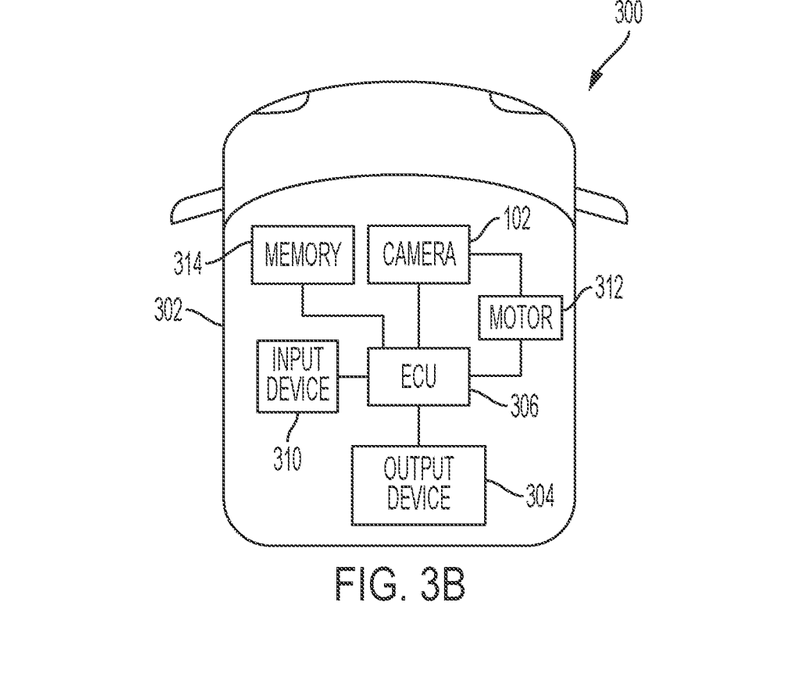
FIG. 3B shows a schematic view of a calibration system for a vehicle according to an aspect of the present disclosure.

FIG. 3B shows a schematic view of a calibration system 300 for a vehicle 302. The vehicle 302 may have one or more specifications of the vehicle 104 (see FIGS. 1-2). The calibration system 300 may include one or more components of the vehicle 302. The components of the vehicle 302 may include the camera 102, an output device 304, an ECU 306, an input device 310, a motor 312, and a memory 314. The ECU 306, the input device 310, the motor 312, and the memory 314 may have one or more specifications of the ECU 206, the input device 210, the motor 212, and the memory 214, respectively (see FIG. 3A). The output device 304 may have one or more specifications of the output device 112 (see FIG. 2).

The vehicle 302 is a conveyance capable of transporting a person, an object, or a permanently or temporarily affixed apparatus. The vehicle 302 may have an automatic or manual transmission. The vehicle 302 may be a self-propelled wheeled conveyance, such as a car, an SUV, a truck, a bus, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. The vehicle 302 may be an autonomous or semi-autonomous vehicle having self-driving capabilities.

The output device 304 may output visuals such as the image 100 (see FIG. 1). In some embodiments, the output device 304 may additionally output information through auditory and/or haptic means. For example, the output device 304 may include a display, which may be a touchscreen display. Additionally, the output device 304 may include a speaker and/or a vibration motor. The user may receive information visually through the display. Further, the user may receive information auditorily through the speaker and/or haptically through the vibration motor. The output device 304 may be positioned at a location visible to the user. For example, the output device 304 may be located on or integrated with a gauge cluster, a dashboard, and/or a back of a headrest of the vehicle 302.

The ECU 306 may be programmed to control one or more operations of the vehicle 302. In some embodiments, there may be a plurality of ECUs 306. The ECU 306 may be electrically coupled to one or more components of the vehicle 302. For example, the ECU 306 may be coupled to the camera 102, the output device 304, the ECU 306, the input device 310, the motor 312, and the memory 314 as shown in FIG. 3B. The ECU 306 may process data for and control the one or more components of the vehicle 302. In some embodiments, the ECU 306 may be a central ECU configured to control one or more operations of the entire vehicle 302. In some embodiments, the ECU 306 may be multiple ECUs located within the vehicle 302 and each configured to control one or more local operations of the vehicle 302. Multiple ECUs may communicate with each other via a controller area network (CAN bus) system or another conventional vehicle communication system.

In some embodiments, the ECU 306 may be one or more computer processors or controllers configured to execute instructions stored in a non-transitory memory. The memory 314 may store machine-readable instructions usable by the ECU 306 and may store other data as requested by the ECU 306. The memory 314 may be a random-access memory (RAM), a disk, a flash memory, optical disk drives, a hybrid memory, or any other storage medium that can store data. The memory 314 may store data in an encrypted or any other suitable secure form.

The input device 310 may receive visual, auditory, and/or touch input. For example, the input device 310 may include a camera, a microphone, a touchscreen, a button, and/or a remote. The user may input commands and information into the input device 310 for the ECU 306 to process and use to control the one or more components of the vehicle 302. For example, the input device 310 may receive biometric information, voice command, and/or touch input with one or more fingers. In some embodiments, the input device 310 and the output device 304 may be integrated together. For example, the input device 310 and the output device 304 may be combined in a center display unit or an infotainment system of the vehicle 302. A touchscreen display of the center display unit or the infotainment system may both output visuals and receive touch input, for example.

The motor 312 may adjust the aim of the camera 102. The motor 312 may receive control instructions directly from the output device 304 through the ECU 306. The ECU 306 may control the motor 312 based on input received by the input device 310. The motor 312 may be a DC motor, an AC motor, a servo motor, or any other conventional electric motor. In some embodiments, the motor 312 may be absent, and the camera 102 may be adjusted manually by hand or alternative mechanically by an actuator or another mechanical device.

During calibration, the camera 102 may capture the image 100 (see FIG. 1), and the image 100 may be communicated to the output device 304. The image 100 may be stored in the memory 314. The ECU 306 may generate the first overlay 114 (see FIG. 2) and the second overlay 116 (see FIG. 2) based on the image 100 and other factors which will be discussed in greater detail. The output device 304 may receive and display the first overlay 114 (see FIG. 2) and the second overlay 116 (see FIG. 2) over the image 100 (see FIG. 2). The user may then adjust the aim of the camera 102 by hand or by entering input into the input device 310 until the first overlay 114 is aligned with the second overlay 116. In embodiments where adjustment instructions are entered into the input device 310, the instructions may be processed by the ECU 306 to actuate the motor 312. In some embodiments, the ECU 306 may automatically align the first overlay 114 with the second overlay 116, generate alignment instructions, and process the instructions to actuate the motor 312.

Figure 4:
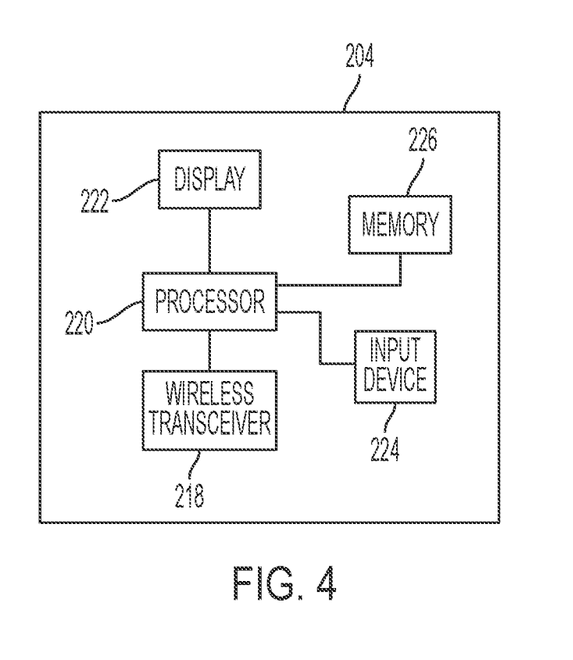
FIG. 4 shows a schematic view of a device for calibrating a camera of a vehicle according to an aspect of the present disclosure.

FIG. 4 shows a schematic view of the output device 204. The output device 204 may have a wireless transceiver 218, a processor 220, a display 222, an input device 224, and a memory 226.

The wireless transceiver 218 may wirelessly exchange information with the wireless transceiver 208 (see FIG. 3A) of the vehicle 202 (see FIG. 3A) and/or the server 216 (see FIG. 3A). The wireless transceiver 218 may include but is not limited to a cellular, a Bluetooth®, an IR, an RF, or a WiFi® based communication hardware. In some embodiments, some or all of the aforementioned communication methods may be available for selection of the user based on preference or suitability (e.g., signal travel distance, signal availability, signal interference, signal travel speed, etc.). The wireless transceiver 218 may utilize another conventional wireless communication technology.

The processor 220 may be configured to execute machine-readable instructions. In some embodiments, there may be one or more processors or microprocessors. In some embodiments, the processor 220 may be a part of a controller or a microcontroller comprising one or more integrated circuits configured to control and manage operations of the output device 204. The processor 220 may be coupled to or in electronic communication with the wireless transceiver 218, the display 222, the input device 224, and the memory 226.

The display 222 may be a liquid crystal display (LCD), a light-emitting diode display (LED), an organic light emitting diode (OLED), a plasma display, a cathode-ray tube (CRT) display, a digital light processing display (DLPT), a micro-display, a projection display, or any other conventional display. The display 222 may display user interfaces, text, images, and/or the like.

The input device 224 may receive visual, auditory, and/or touch input. For example, the input device 224 may include a camera, a microphone, a touchscreen, a button, and/or a remote. The user may input commands and information into the input device 224 for the processor 220 to process and use to operate the output device 204. For example, the input device 224 may receive biometric information, voice command, and/or touch input with one or more fingers. In some embodiments, the input device 310 and the display 222 may be integrated together. A touchscreen display may both output visuals and receive touch input, for example.

The memory 226 may be a random-access memory (RAM), a disk, a flash memory, optical disk drives, a hybrid memory, or any other storage medium that can store data. The memory 226 may store data in an encrypted or any other suitable secure form.

During calibration, the wireless transceiver 218 may receive the image 100 (see FIG. 1) from the wireless transceiver 208 (see FIG. 3A) of the vehicle 202 (see FIG. 3A) and/or the server 216 (see FIG. 3A). The processor 220 may generate the first overlay 114 (see FIG. 2) and the second overlay 116 (see FIG. 2) based on the image 100 and other factors which will be discussed in greater detail. The display 222 may display the first overlay 114 (see FIG. 2) and the second overlay 116 (see FIG. 2) over the image 100 (see FIG. 2). The user may then adjust the aim of the camera 102 (see FIG. 3A) by entering input into the input device 224 until the first overlay 114 is aligned with the second overlay 116. The wireless transceiver 218 may communicate the instructions to the wireless transceiver 208 of the vehicle 202 directly or through the server 216, and then the ECU 206 (see FIG. 3A) of the vehicle 202 may process the instructions to actuate the motor 212 (see FIG. 3A). In some embodiments, the processor 220 may automatically align the first overlay 114 with the second overlay 116, generate alignment instructions, and communicate the instructions to the ECU 206 through the wireless transceiver 208 and/or the server 216. The memory 226 may store a program for the processor 220 to run to analyze the horizontal and vertical displacement between the first overlay 114 and the second overlay 116 and translate that displacement to an angular displacement to adjust the aim of the camera 102. The ECU 206 may then process the instructions to interpret the angular displacement in terms of motor rotation to actuate the motor 212. In some embodiments, the output device 204 may have motion sensors (e.g., a gyroscope, an accelerometer, etc.) that enables the user to translate movement of the output device 204 in three-dimensional space to motor control input to adjust the camera 102 and align the first overlay 114 with the second overlay 116 with the input.

Figure 5:
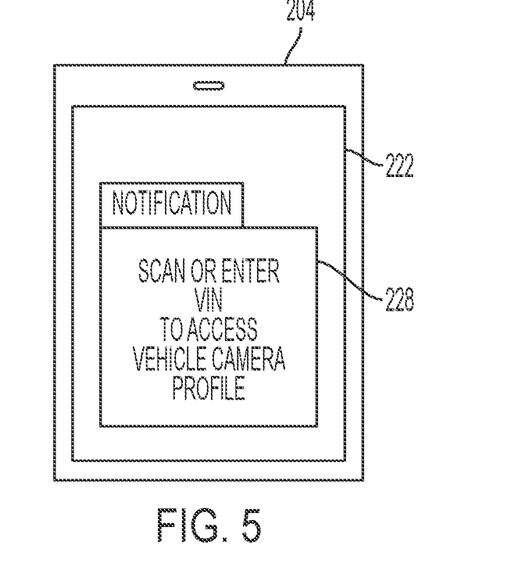
FIG. 5 shows a schematic view of the device of FIG. 4 prompting a VIN input to produce a vehicle camera profile according to an aspect of the present disclosure.

FIG. 5 shows a schematic view of the output device 204 prompting a VIN input to produce a vehicle camera profile. The display 222 may display a notification 228 to scan or enter a VIN to access the vehicle camera profile. The VIN may be located on the associated vehicle or on a physical or virtual document. The VIN may be scanned or entered manually by the input device 224 (see FIG. 4). The input device 224 may recognize the VIN via alphanumeric character detection. In some embodiments, the input device 224 may include a virtual or physical keypad and/or keyboard for the user to enter the VIN. Once the VIN is entered for the vehicle for which a camera calibration is desired, the VIN may be used to search and identify stored information about that vehicle. The stored information may include vehicle specifications including vehicle camera specifications. The vehicle specifications may include physical features and dimensions of the vehicle. The camera specifications may include lens information, camera position, and field of view dimensions. The stored information may further include machine readable instructions to generate the vehicle camera profile based on the vehicle specifications and the vehicle camera specifications. The vehicle camera profile may include information regarding shapes and/or positions of the first overlay 114 (see FIG. 2) and the second overlay 116 (see FIG. 2) which are vehicle specific.

Figure 6:
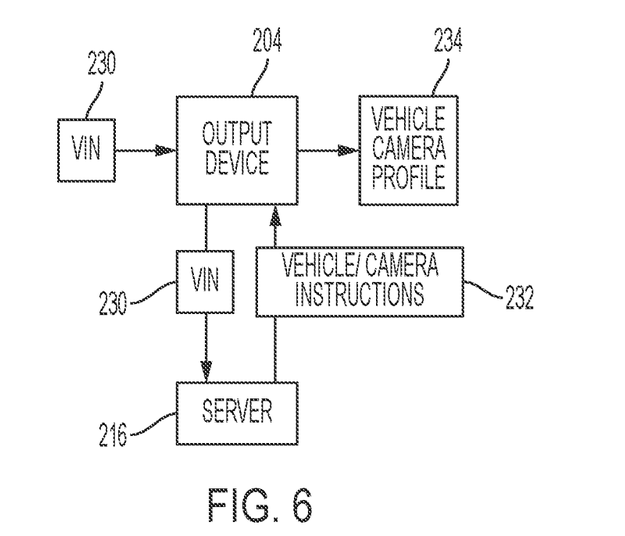
FIG. 6 shows a block diagram of the device of FIG. 4 producing the vehicle camera profile of FIG. 5 according to an aspect of the present disclosure.

FIG. 6 shows a block diagram of the output device 204 producing the vehicle camera profile. Initially, the VIN 230 may be scanned or entered manually by the input device 224 (see FIG. 4) of the output device 204. The wireless transceiver 218 (see FIG. 4) of the output device 204 may communicate the VIN 230 to the server 216. The server 216 may store vehicle and camera specific instructions for a variety of vehicles. The vehicle and camera specific instructions may each be identified by a VIN. The server 216 may communicate the vehicle and camera specific instructions 232 associated with the VIN 230 to the output device 204. In some embodiments, the vehicle and camera specific instructions may be stored locally in the memory 226 instead of or in addition to the server 216. The processor 220 (see FIG. 4) of the output device 204 may then read the instructions 232 to generate the vehicle camera profile 234 which includes the first overlay 114 (see FIG. 2) and/or the second overlay 116 (see FIG. 2).

Figure 7:
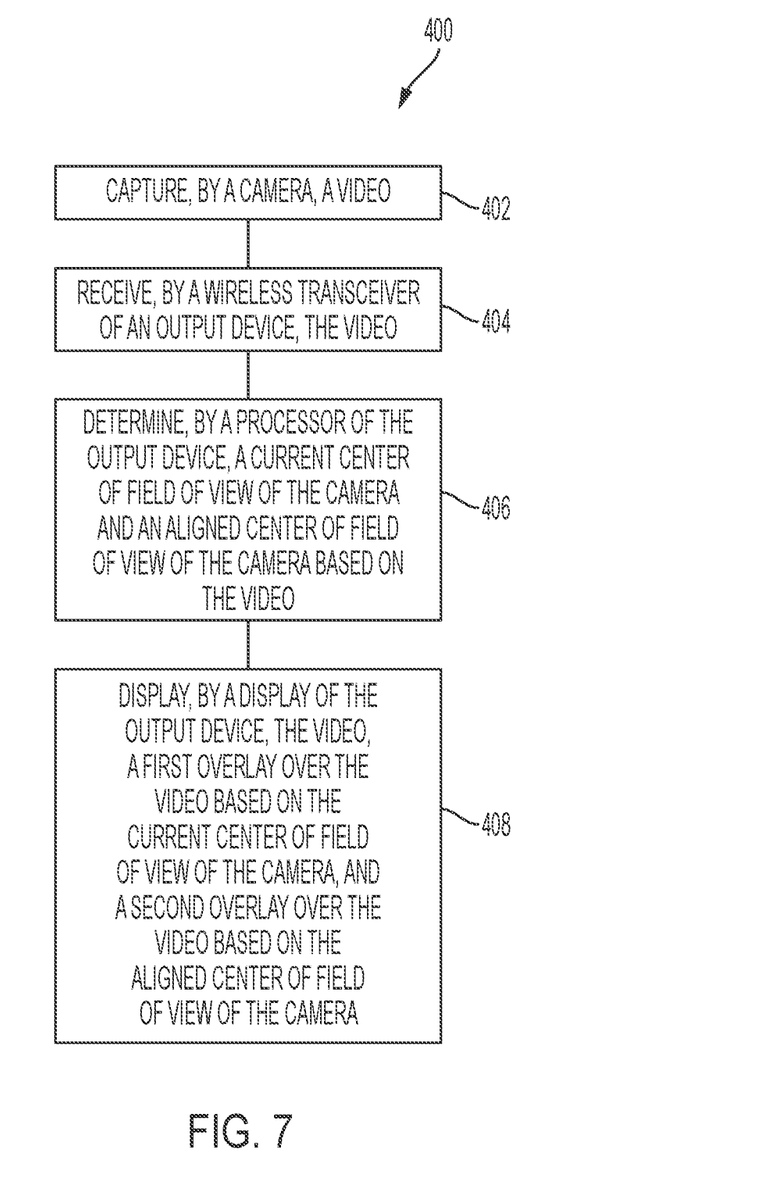
FIG. 7 shows a flowchart of a method for calibrating a camera of a vehicle according to an aspect of the present disclosure.

FIG. 7 shows a flowchart of a method 400 for calibrating the camera 102 of the vehicle 202. Some or all components of the system 200 (see FIG. 3A) may be utilized to carry out the steps of the method 400. The method 400 may begin with block 402.

In block 402, the method 400 may include the camera 102 (see FIG. 3A) capturing a video or the image 100 (see FIG. 1). In block 404, the method 400 may include the wireless transceiver 218 (see FIG. 4) of the output device 204 receiving the image 100. The wireless transceiver 208 (see FIG. 3A) of the vehicle 202 may communicate the image 100 to the wireless transceiver 218.

In block 406, the method 400 may include the processor 220 (see FIG. 4) of the output device 204 determining a current center of field of view of the camera 102 and an aligned center of field of view of the camera 102 based on the image 100. The current center of field of view may be determined based on the current position of the visible portion of the exterior 106 (see FIG. 2) relative to the borders of the field of view of the camera 102. The determination of the current center of field of view may be based on the following exercise, for example. First, a center of the visible portion of the exterior 106 may be determined based on the dimensions of the visible portion of the exterior 106. Then, a vertical line may be passed through the center. Thereafter, a horizontal line may be passed through the vertical line where the horizontal line bisects the current field of view. The current center of field of view is where the vertical line and the horizontal line meet.

An aligned center of field of view of the camera 102 may be determined based on instructions specific to the vehicle 202 and the camera 102. Based on the instructions, the processor 220 may determine a position where the visible portion of the exterior 106 is horizontally centered relative to the borders of the field of view and vertically at an optimal position. A center of the visible portion of the exterior 106 at the said centered and optimal position may be determined based on the dimensions of the visible portion of the exterior 106. A vertical line may then be passed through the center. Then, a horizontal line may be passed through the vertical line where the horizontal line bisects an aligned field of view, or in other words, a field of view where the visible portion of the exterior is horizontally centered and vertically optimally positioned. The aligned center of field of view is where the vertical line and the horizontal line meet.

In block 408, the display 222 (see FIG. 4) of the output device 204 may display the image 100, the first overlay 114 (see FIG. 2) over the image 100 based on the current center of field of view of the camera 102, and the second overlay 116 (see FIG. 2) over the image 100 based on the aligned center of field of view of the camera 102. The user may then adjust the aim of the camera 102 until the first overlay 114 is aligned with the second overlay 116 to calibrate the camera 102.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A calibration system for a vehicle, comprising:
a camera configured to be attached to the vehicle and capture a video of an exterior of the vehicle;
an output device having a display, the output device configured to receive the video and display the video, a first overlay over the video indicating a current center of field of view of the camera, and a second overlay over the video indicating an aligned center of field of view of the camera on the display;
a motor configured to adjust an aim or a lens of the camera so that the first overlay is aligned with the second overlay; and
an electronic control unit (ECU) communicatively coupled to the camera, the output device, and the motor, and configured to:
retrieve a vehicle identification number (VIN) associated with the vehicle,
identify camera specific instructions of the vehicle based on the VIN, the camera specific instructions including machine readable instructions to generate a vehicle camera profile,
determine the current center of field of view of the camera based on a current position of the visible portion of the exterior of the vehicle relative to one or more borders of the field of view of the camera,
determine the aligned center of field of view of the camera based on the camera specific instructions, and
cause display, via the output device, of the first overlay over the video indicating the determined current center of field of view, and the second overlay over the video indicating the determined aligned center of field of view.

2. The calibration system of claim 1, wherein the output device is further configured to generate the second overlay based on the VIN.

3. The calibration system of claim 2, wherein the output device is further configured to retrieve locally or remotely stored instructions specific to the vehicle and the camera to generate the first overlay and the second overlay based on the VIN.

4. The calibration system of claim 2, wherein the output device is further configured to determine positions of the first overlay and the second overlay based on the visible portion of an exterior of the vehicle in the video.

5. The calibration system of claim 1, wherein the output device is a remote device or a center display unit of the vehicle.

6. The calibration system of claim 1, further comprising a mechanical device configured to adjust the aim of the camera based on user input or locally or remotely stored data associated with a previously performed calibration.

7. The calibration system of claim 6, wherein the user input comprises aligning the first overlay with the second overlay on the display of the output device such that the first overlay overlaps with the second overlay.

8. A device for calibrating a camera of a vehicle, comprising:
a wireless transceiver configured to receive a video of an exterior of the vehicle from the camera;
an input device configured to receive a vehicle identification number (VIN) of the vehicle;
a processor coupled to the wireless transceiver and the input device and configured to:
identify camera specific instructions of the vehicle based on the VIN, the camera specific instructions including machine readable instructions to generate a vehicle camera profile, and
generate a first overlay indicating a current center of field of view of the camera and a second overlay indicating an aligned center of field of view of the camera based on the received video, the aligned center of field of view of the camera being determined based on the camera specific instructions, and the current center of field of view of the camera being determined based on a visible portion of the exterior of the vehicle in the video relative to one or more borders of the field of view of the camera;
a display configured to be coupled to the processor and display the video, the first overlay over the video, and the second overlay over the video; and
a motor configured to adjust an aim or a lens of the camera so that the first overlay is aligned with the second overlay.

9. The device of claim 8, wherein the processor is further configured to generate the second overlay based on the VIN.

10. The device of claim 9, further comprising a memory configured to be coupled to the processor and store instructions specific to the vehicle and the camera or wherein the wireless transceiver is further configured to receive the instructions from a remote server, and wherein the processor is further configured to select the instructions based on the VIN and generate the first overlay and the second overlay based on the instructions.

11. The device of claim 9, wherein the processor is further configured to determine positions of the first overlay and the second overlay based on the visible portion of an exterior of the vehicle in the video.

12. The device of claim 9, wherein the input device is further configured to receive user input and the wireless transceiver is further configured to communicate the received user input to an electronic control unit (ECU) of the vehicle to adjust the aim of the camera based on the user input.

13. The device of claim 12, wherein the user input comprises aligning the first overlay with the second overlay.

14. The device of claim 8, wherein the device is attachable to the vehicle.

15. A method for calibrating a camera of a vehicle, comprising:
   capturing, by the camera, a video of an exterior of the vehicle;
   receiving, by a wireless transceiver of an output device, the video;
   receiving, by the wireless transceiver of an output device, a vehicle identification number (VIN) of the vehicle;
   identifying, by a processor of the output device, camera specific instructions of the vehicle based on the VIN, the camera specific instructions including machine readable instructions to generate a vehicle camera profile;
   determining, by the processor of the output device, a current center of field of view of the camera and an aligned center of field of view of the camera based on the video, the aligned center of field of view of the camera being determined based on the camera specific instructions, and the current center of field of view of the camera being determined based on a visible portion of the exterior of the vehicle in the video relative to one or more borders of the field of view of the camera;
   displaying, by a display of the output device, the video, a first overlay over the video based on the current center of field of view of the camera, and a second overlay over the video based on the aligned center of field of view of the camera; and
   adjusting, by a motor, an aim or a lens of the camera so that the first overlay is aligned with the second overlay.

16. The method of claim 15, wherein the processor of the output device determines the aligned center of field of view of the camera further based on the VIN.

17. The method of claim 16, further comprising retrieving, by the processor of the output device, locally or remotely stored instructions specific to the vehicle based on the VIN, wherein the processor of the output device determines the current center of field of view of the camera and the aligned center of field of view of the camera further based on the instructions.

18. The method of claim 16, further comprising determining, by the processor of the output device, positions of the first overlay and the second overlay based on the visible portion of an exterior of the vehicle in the video.

19. The method of claim 15, further comprising adjusting, by a mechanical device of the vehicle, the aim of the camera based on user input or locally or remotely stored data associated with a previously performed calibration.

20. The method of claim 19, further comprising aligning, by an input device of the output device, the first overlay with the second overlay on the display of the output device to generate the user input such that the first overlay overlaps with the second overlay.

* * * * *